United States Patent [19]

Heywood

[11] Patent Number: 4,785,616
[45] Date of Patent: Nov. 22, 1988

[54] MANUFACTURE OF CABLES
[75] Inventor: Clifford Heywood, Essex, England
[73] Assignee: Telephone Cables Limited, England
[21] Appl. No.: 69,097
[22] Filed: Jul. 2, 1987
[30] Foreign Application Priority Data
Jul. 31, 1986 [GB] United Kingdom ............... 8618662
[51] Int. Cl.$^4$ .................. D07B 7/14; H01B 13/24
[52] U.S. Cl. ............................... 57/7; 57/293; 57/296
[58] Field of Search .............. 57/7, 293, 295, 296, 57/297

[56] References Cited

U.S. PATENT DOCUMENTS

| | | | |
|---|---|---|---|
| 3,889,455 | 6/1975 | Portinari et al. | 57/7 |
| 4,017,579 | 4/1977 | Roe et al. | 57/7 X |
| 4,171,609 | 10/1979 | Feese . | |
| 4,388,800 | 6/1983 | Trezeguet et al. | 57/7 |
| 4,426,837 | 1/1984 | Meilenner et al. | 57/293 |
| 4,441,787 | 4/1984 | Lichtenberger | 57/7 X |
| 4,541,970 | 9/1985 | Caverley et al. . | |
| 4,620,412 | 11/1986 | Portinari | 57/352 X |

FOREIGN PATENT DOCUMENTS

| | | |
|---|---|---|
| 0066201 | 10/1985 | European Pat. Off. . |
| 644530 | 10/1950 | United Kingdom . |
| 766862 | 1/1957 | United Kingdom . |
| 1573331 | 8/1980 | United Kingdom . |
| 2081323 | 2/1982 | United Kingdom . |

Primary Examiner—Donald Watkins
Attorney, Agent, or Firm—Kirschstein, Kirschstein, Ottinger & Israel

[57] ABSTRACT

In the manufacture of a cable having a plurality of filamentary members such as wires, optical fibres or the like within an extruded thermoplastic sheath the members are twisted into a periodically reversing helical configuration immediately prior to the extrusion of the sheath around them, and the extruded sheath is rapidly cooled on emergence from the extruder head so as to cause the extrudate to set and thereby retain the members in the twisted condition.

11 Claims, 1 Drawing Sheet

MANUFACTURE OF CABLES

BACKGROUND OF THE INVENTION

1. Field of the Invention

This invention relates to the manufacture of cables of the kind comprising a plurality of filamentary members, such as wires, optical fibres and the like, within a protective extruded sheath.

2. Description of Related Art

In order to prevent an undue strain being imposed on the fibres of an optical cable it has been proposed that they follow a periodically reversing path around the cable axis.

SUMMARY OF THE INVENTION

One object of the invention is to provide a method of manufacturing cables of this form. However the invention can also be used to advantage in the manufacture of cables in which the filamentary members incorporate other elements besides optical fibres.

According, therefore, to the invention, in the manufacture of a cable of the kind referred to the filamentary members are twisted in a periodically reversing helical fashion about a central axis immediately prior to the extrusion of the protective sheath around them, and the extruded sheath is cooled on emergence from the extruder head so as to cause the extrudate to set and thereby retain the members in the twisted condition.

Preferably the filamentary members are twisted in a periodically reversing fashion about a central core which may be of metal or other materials such as a glass reinforced plastic or a thermoplastic material having a higher or lower softening temperature than the material of the sheath, the core being fed through the extruder head with the filamentary members.

In order to obtain or increase the filamentary member overfeed, the central core may be tensioned during the twisting of the filamentary members and the extrusion and cooling of the sheath. After the sheath has been cooled, the tension is released allowing the central core to contract. This has the effect of reducing the pitch of the twisted filamentary members and increasing the percentage of overfeed.

In the manufacture of optical cables at least one of the filamentary members will be in the form of an optical fibre element, which term not only includes a single optical fibre but also a bundle of fibres surrounded by a protective coating or contained within a tight or loose fitting tube. Where an optical fibre element comprises a bundle of fibres these may be in a stranded or stacked configuration, and in some cases the fibres may be in the form of a ribbon or other desired disposition.

In addition, at least one of the filamentary members may be an insulated conductor element, which term not only includes a single insulated conductor but also a group of insulated conductors.

Cooling of the extrudate is conveniently effected by directing one or more jets of a cooling fluid, which may be in the form of a gas or alternatively a liquid such as water, on to the extrudate immediately as it emerges from the extruder head.

Alternatively, the extrudate may be cooled by passing it into a cooling trough containing a fluid such as water.

The invention not only relates to the method of manufacturing cables of the kind referred to but also to apparatus for carrying out said method.

According therefore to another aspect of the invention, apparatus for use in manufacturing a cable of the kind referred to comprises an extruder head, a plate having a plurality of axially directed holes spaced around it, means for oscillating the plate about its axis within the extruder head, means for feeding a filamentary member through each of said holes as the plate is oscillated in use of the apparatus, such that on emergence therefrom they are twisted in a periodically reversing helical fashion, and the disposition of the plate being such that a sheath of thermoplastic material is extruded around the twisted members, the apparatus including also means for cooling the extrudate as it emerges from the extruder head.

In some cables manufactured in accordance with the invention the filamentary members may comprise both optical fibre elements and wires.

BRIEF DESCRIPTION OF THE DRAWINGS

One method of manufacturing an optical cable in accordance with the invention, apparatus for carrying out the method, and a modification of the method, will now be described by way of example with reference to FIGS. 1 and 2 of the accompanying schematic drawing, in which.

DETAILED DESCRIPTION OF THE PREFERRED EMBODIMENTS

Figure 1:
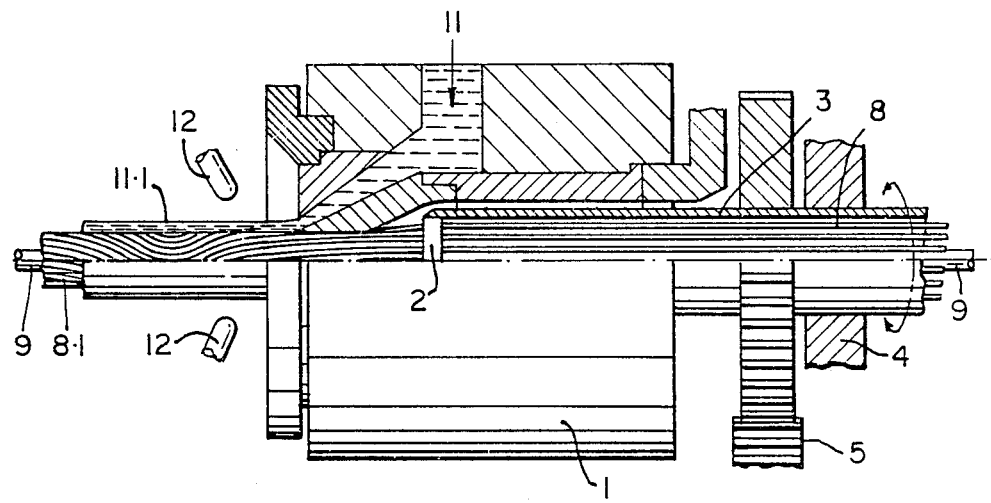
FIG. 1 represents a part-axial section through the apparatus.
Figure 2:
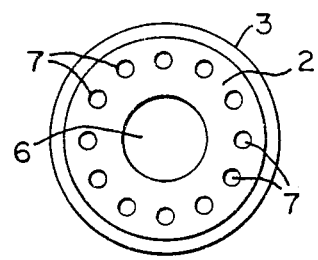
FIG. 2 represents an end view of part of the apparatus.

Thus, the apparatus comprises an extruder head 1 having a central passageway containing a lay plate 2 extending across the inner end of a support tube 3, which is itself supported in bearings 4 and is arranged to be oscillated about its axis by a suitable actuating arrangement shown diagrammatically at 5. The plate 2 has a central circular aperture 6 (FIG. 2) surrounded by a plurality of smaller uniformly spaced apertures 7.

In use the ends of optical fibre elements 8, each of which may comprise one or a plurality of optical fibres tightly or loosely encased in a protective tube, and arranged in a coiled or "Figure 8" formation in individual containers or bobbins (not shown), are arranged to be threaded through respective apertures 7, and the end of a core 9 of extruded thermoplastic material, carried by a drum (also not shown), is arranged to be fed through the central aperture 6. This is preferably accomplished with the lay plate 2 removed from the extruder head 1. After reinsertion of the lay plate 2 within the extruder head 1, the elements 8 and core 9 are fed through the respective apertures 6, 7, while the lay plate 2 is oscillated about its axis in alternately clockwise and anticlockwise directions, so causing the elements 8 to be twisted in a periodically reversing helical fashion about the core 9. At the same time a thermoplastic material 11 is extruded around the assembly to form an outer sheath as at 11.1, some of the softened thermoplastic material penetrating between the interstices of the tubes. Immediately as the extruded sheath material leaves the extruder head it is chilled by jets of cold water directed on to its surface by suitably positioned nozzles as at 12. This produces a rapid setting of the thermoplastic material 11 and the oscillatory lay of the elements 8 as indicated at 8.1 is "captured" by the extrudate and locked in this form.

In some cases a plurality of lay plates are arranged to oscillate in synchronism but by gradually increasing angular amounts in the direction of feed of the fibre elements may be used to provide a greater degree of twist than may readily be achieved utilising a single lay plate only.

In a modification of the method above described the core is formed of suitably strong elastic material and is fed to the extruded head via a first capstan, the cooled assembly, comprising the core, sheath and fibres being fed around a further capstan. The relative speeds of the capstans are arranged to be such that the core is stretched between the capstans, and after passing the second capstan it is permitted to relax so causing the sheath to contract, and reducing the pitch of the fibres, thereby ensuring an increase in the length of the fibres for a given length of cable. By this means the possibility of the fibres being stressed during subsequent manufacture or use of the cable is significantly reduced.

I claim:

1. A method of manufacturing a cable comprising the steps of:
   (a) twisting a plurality of filamentary members in a periodically reversing helical fashion about a central axis;
   (b) extruding a protective sheath around the twisted members immediately following the twisting step; and
   (c) cooling the extruded sheath immediately following the extruding step so as to cause the material of the sheath to set and thereby retain the twisted members in a twisted condition.

2. The method according to claim 1, wherein the cooling step is performed by directing at least one jet of cooling fluid onto a surface of said extruded sheath.

3. The method according to claim 1 wherein the filamentary members are twisted in a periodically reversing helical fashion about a central core.

4. The method according to claim 3 and tensioning the central core during the twisting and the extruding and cooling steps.

5. The method according to claim 4 wherein the core is formed from a thermoplastic material.

6. The method according to claim 5 wherein the thermoplastic material of the core has a higher softening temperature than the material of the sheath.

7. The method according to claim 1 wherein at least one of the filamentary members comprises an optical fibre element.

8. The method according to claim 1 wherein at least one of the filamentary members comprises an insulated conductor element.

9. The method according to claim 2 wherein said cooling fluid is water.

10. Apparatus for manufacturing a cable, comprising:
    (a) an extruder head;
    (b) a plate having a plurality of axially directed holes spaced around an axis;
    (c) means for oscillating said plate about said axis within said extruder head;
    (d) means for feeding a filamentary member through each of said holes as said plate is oscillated in use of the apparatus such that, on emergence therefrom, said filamentary members are twisted in a periodically reversing helical fashion;
    (e) means for extruding a sheath of thermoplastic material around the twisted members; and
    (f) means for cooling said extruded sheath at a position at which it emerges from the extruder head.

11. The apparatus according to claim 10, wherein the cooling means comprises at least one nozzle located so as to direct a jet of cooling fluid onto the extruded sheath as it emerges from the extruder head.

* * * * *